United States Patent [19]

Mihailide

[11] 3,935,318

[45] Jan. 27, 1976

[54] DISPOSABLE APPARATUS FOR BREWING A BEVERAGE SUCH AS COFFEE

[76] Inventor: Sergio Mihailide, Alabama 41 - Apt. 101, Colonia Napoles ZP18, Mexico City, Mexico

[22] Filed: Oct. 12, 1974

[21] Appl. No.: 512,876

[52] U.S. Cl. ................... 426/80; 99/297; 426/282
[51] Int. Cl.² .......................................... B65B 29/02
[58] Field of Search ........................... 426/77–84; 99/297

[56] References Cited
UNITED STATES PATENTS

| | | | |
|---|---|---|---|
| 674,456 | 5/1901 | Garden | 99/297 |
| 2,260,858 | 10/1941 | Naef | 426/82 |
| 2,291,060 | 7/1942 | Schiess | 99/323 |
| 2,943,940 | 7/1960 | Wiedemann | 426/396 |
| 3,193,388 | 7/1965 | Conrey | 426/80 |
| 3,657,993 | 4/1972 | Close | 99/297 |

Primary Examiner—Norman Yudkoff
Assistant Examiner—Martin G. Mullen
Attorney, Agent, or Firm—Lowe, King & Price

[57] ABSTRACT

The invention is directed to an apparatus for brewing a beverage such as coffee or tea. A disposable disc-shaped receptacle contains a predetermined quantity of solid beverage material. The flat lower surface of the receptacle contains a plurality of perforations permitting a flow of hot water into the receptacle for brewing the beverage material. The upper portion of the receptacle is a concave flexible membrane. An actuating rod or stick is attached to the membrane for manually flexing the membrane up and down during brewing. The user places the receptacle into a cup of hot water and using the stick, manually flexes the membrane up and down inducing successive positive and negative pressure variations inside the receptacle. These pressure variations suck and expel hot water through the perforations and thoroughly circulate the water inside the receptacle and throughout the beverage material for brewing. The receptacle is removed from the cup and discarded when the liquid beverage reaches the desired strength.

16 Claims, 4 Drawing Figures

DISPOSABLE APPARATUS FOR BREWING A BEVERAGE SUCH AS COFFEE

FIELD OF THE INVENTION

The present invention relates generally to a method of and apparatus for brewing beverages and particularly to a throw-away device adapted to instantly brew a single cup or other container of beverage such as coffee or tea.

BACKGROUND OF THE INVENTION

It is generally recognized that freshly brewed coffee is superior in flavor to the various instant coffees currently available in the market. Instant coffees are popular in spite of their flavor because of their convenience. A cup of hot instant coffee is prepared by simply dissolving a measure of instant coffee material into a cup of hot water and stirring. On the other hand, freshly brewed coffee typically requires apparatus for slowly running hot water through ground coffee while keeping the grounds from entering the final product. Such apparatus must be washed and stored away after use and are therefore impractical for brewing a single cup of coffee.

Prior apparatus for brewing a single cup of beverage such as coffee or tea typically comprise a water-permeable receptacle such as a bag containing the solid beverage material, i.e., ground coffee or tea leaves. The receptacle is placed in a cup of hot water and manually agitated in order to circulate hot water through the beverage material. A stick or spoon is often used to force the receptacle against the bottom and sides of the cup to increase circulation. An example of such a device is disclosed in Lamb et al U.S. Pat. No. 2,123,054. Examples of other such devices of which I am aware are shown in the U.S. Pat. Nos. to Eaton 2,285,113, Haut 2,092,510, Perry, Jr. 2,484,461, Hiscock 2,749,834 and Weisman 3,139,344.

While such apparatus are generally somewhat satisfactory, circulation of the hot water through the receptacle is inadequate for thoroughly brewing the beverage material. This is so because insufficient pressure is created in the receptacle to force the hot water through the innermost beverage material. As a result, the flavor of the liquid beverage is often diminished and an excessive amount of the beverage material must be provided inside the receptacle. Further, the prior art apparatus of which I am aware are inconvenient to use because the beverage-soaked, receptacle that must be removed from the cup and discarded often drips which is offensive. Therefore, insofar as I am aware, none of these devices has become commercially successful.

SUMMARY OF THE INVENTION

Accordingly, it is one object of the present invention to provide a new and improved method and apparatus for brewing a beverage, such as ground coffee.

It is another object of the present invention to provide a convenient disposable device for brewing a single cup of beverage.

A still further object of the present invention is to provide a disposable device for brewing beverages wherein hot water is thoroughly circulated throughout the ground beverage.

Another object of the present invention is to provide a disposable device incorporating pumping action to force hot water through the solid beverage material for brewing.

It is still another object of the present invention to provide a new and improved device for brewing a beverage wherein the solid beverage material is more efficiently utilized.

It is yet another object of the present invention to provide a disposable beverage brewing device with minimum dripping of the beverage following use.

It is a further object of the present invention to provide a disposable device for brewing a beverage that is economical to manufacture and convenient to use.

BRIEF DESCRIPTION OF THE INVENTION

In satisfaction of the foregoing objects and advantages there is provided by this invention a method and apparatus, wherein a receptacle containing solid beverage material, such as ground coffee or tea leaves, is placed in a cup of hot water. A membrane portion of the receptacle is manually impulsed with an actuating rod or stick thereby forcing hot water to be alternately sucked and expelled through a perforated portion and throughly circulated through the beverage material. More specifically, in the inventive method a disposable device comprising an actuating stick or rod and a receptacle containing a solid beverage material is placed in a cup of hot water and a membrane portion is manually flexed with the actuating stick to circulate the hot water through the beverage material. By the term solid beverage material is meant material that is brewed e.g., ground coffee or tea leaves rather than materials that dissolve, e.g. instant coffee.

The apparatus of the present invention contains a disc-shaped receptacle with a lower portion having a generally flat perforated lower surface exposing the beverage material to the hot water. A filter is disposed between the beverage material and lower surface of the device to separate the grounds from the cup. The upper portion of the device contains the flexible membrane that is preferably concave and non-permeable to water. The upper portion is sealed to the lower portion of the device locking in the beverage material and filter. An actuating stick or rod is attached to the receptacle at the center of the membrane for flexing like a plunger.

In brewing the beverage, the device is grasped by the actuating stick or rod and lowered into a cup of hot water. The actuating stick or rod is manually flexed or impulsed by repetitively pressing down and releasing the stick causing the membrane to flex up and down. This plunger-like action creates oscillating positive and negative pressures within the receptacle and sucks and expels hot water through the perforations causing the water to thoroughly circulate through the solid beverage material. The forced reciprocating circulation insures that the hot water thoroughly saturates all the solid beverage material in the receptacle. The membrane is manually flexed up and down until the liquid beverage reaches the desired strength. Then the receptacle is removed from the cup and discarded. The receptacle may be inverted during removal with the perforations upward to minimize dripping.

A peel-off seal may be provided over the perforated lower portion of the receptacle to lock in the flavor and aroma of the beverage material until use. The peel-off seal is conveniently removed by means of a finger tab attached to the seal.

The device is preferably of plastic and may be formed of an inexpensive material, such as polystyrene or other suitable material. The upper and lower portions of the receptacle are joined during manufacture by conventional heat sealing. As indicated, any type of material can be used in forming the device such as plastic, aluminum foil, plastic coated paper and the like as well as mixtures of material.

Still other objects and advantages of the present invention will become readily apparent to those skilled in this art from the following detailed description, wherein I have shown and described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DETAILED DESCRIPTION OF THE PREFERRED EMBODIMENT

Figure 1:
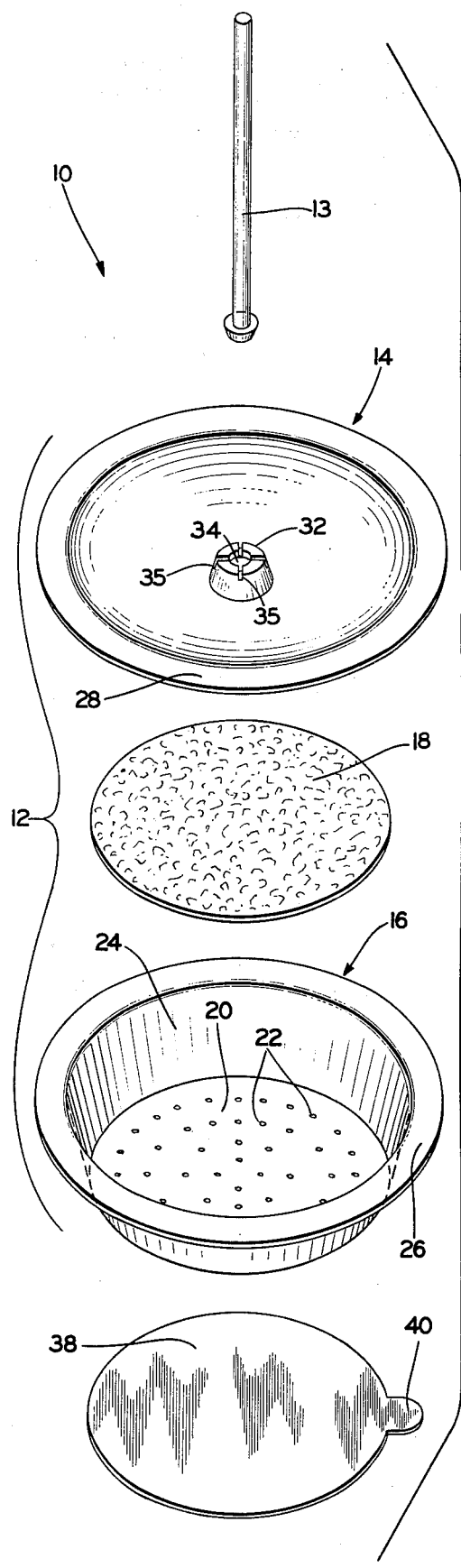
FIG. 1 is an exploded view of the device according to the present invention.

Referring to FIG. 1, the disposable device 10 of the present invention comprises a receptacle 12 for containing a solid beverage material, such as ground coffee or tea leaves, and an actuating stick or rod 13. Receptacle 12 includes an upper portion or lid 14 that is a concave flexible membrane and a lower portion 16 having a generally flat lower surface 20 containing a plurality of perforations 22. Extending upwardly from surface 20 is an annular wall portion 24 that spreads out at the upper extreme to form a circular flange or ridge 26. Corresponding to ridge 26 on lower portion 16 is a flange or ridge 28 formed along the periphery of upper portion 14. When upper portion 14 and lower portion 16 are joined together, ridges 26 and 28 coincide, forming the receptacle 12.

Filter 18 is preferably formed of a porous paper and is mounted directly to lower surface 20 of the lower portion 16 inside receptacle 12. Solid beverage material is disposed over filter 18 that covers the entire perforated lower surface 20 to prevent any particles of the beverage material from slipping through perforations 22 and entering the hot water in the cup.

Upper and lower portions 14 and 16 are preferably formed of a thin plastic such as polystyrene, polypropylene, polyvinyl chloride or other suitable material. Lower portion 16 is substantially rigid along the annular side thereof with the lower surface 20 being only slightly flexible.

Of particular importance to the present invention, the upper portion 14 is substantially flexible to be easily flexed up and down like a plunger. Membrane 14 formed preferably of the same material as forms lower portion 16 is preferably concave and flexible yet resilient. Membrane 14 may also be corrugated for improved flexibility. When membrane 14 is flexed upwardly or downwardly from a rest position with stick 13 and then released, the resiliency of the membrane causes the same to spring back to the rest position. This produces successive opposite changes of pressure inside the receptacle providing pumping action.

Figure 3:
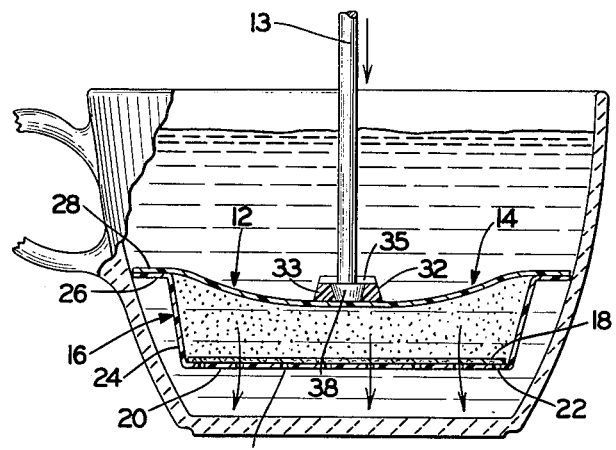
FIGS. 3 and 4 are sectional side views of the device of FIG. 1 showing, respectively, the membrane in its lowered and raised positions for pumping hot water.
Figure 4:
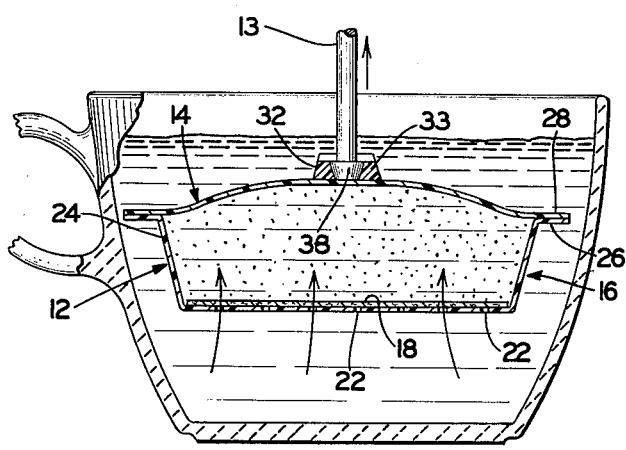

The actuating stick or rod 13, formed preferably of the same material as that of upper and lower portions 14 and 16, is coupled to the membrane 14 at stand-off 32. Stand-off 32, seen more clearly in cross-section in FIGS. 3 and 4, is preferably formed of one piece with the membrane 14 and contains a tapered wall portion 33 forming a frusto conical recess 34. Cross-cuts 35 in stand-off 32 provides some give when the end of stick 13 is pressed into recess 34. An enlarged end portion 38 of the actuating stick 13 is also frusto conical to securely mate with stand-off 32. When portion 38 of stick 30 is brought together with the standoff 32 during manufacture, the stick 13 and membrane 14 couple together by a friction fit forming a single unit. Although not necessary, portion 38 and stand-off 32 can be secured together by conventional means such as epoxy or heat sealing. Also, within the scope of the present invention, other suitable end portion and stand-off configurations can be used for coupling actuating stick 13 to membrane 14.

A peel-off seal 38 is attached outside lower surface 20 covering perforations 22. Peel-off seal 38 is attached to the surface by means of an adhesive and covers all the perforations 22 to seal in the aroma and flavor of the coffee or other material. A finger tab 40 is provided as a portion of seal 38 for easily removing the seal prior to use of device 10. Peel-off seal 38 is formed preferably of aluminum foil but other suitable materials such as polyethylene, paper, etc. may be used.

Figure 2:
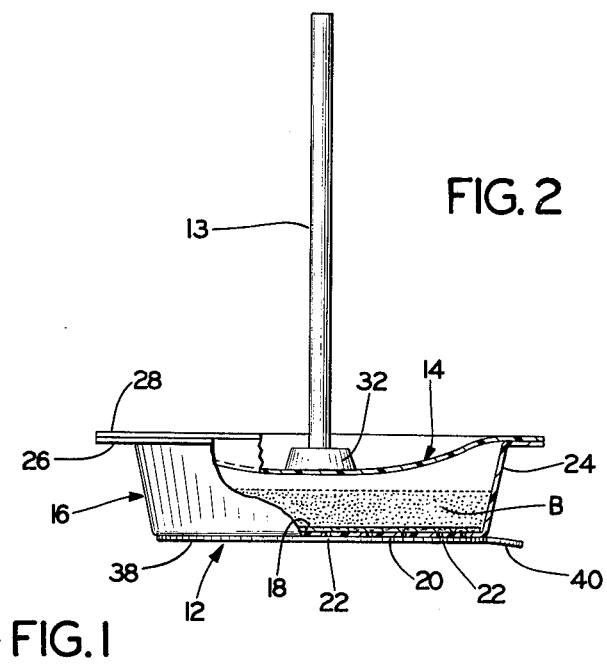
FIG. 2 is a side view of the device with a portion thereof cut away.

During manufacture, the upper and lower portions 14 and 16 and actuating stick or rod 13 are molded by conventional means. Filter 18 is placed in lower portion 16 to cover the perforated lower surface 20 and a predetermined quantity of solid beverage material B, shown in FIG. 2, is deposited into the portion 16. Then the upper and lower portions 14 and 16 are joined together with ridges 28 and 26 coinciding and sealed preferably by conventional heat sealing methods. Although I have found heat sealing to be economical and strong for this purpose, it is understood that other suitable means of joining the portions 14 and 16 could be used.

Actuating stick 13 is press fitted into stand-off 32 and may, if desired, be secured therein with conventional heat sealing means or with epoxy. Finally, peel-off seal 38 is pressed against the outside surface of lower surface 20, as shown in FIG. 2, covering all the perforations 22 to seal off receptacle 12 and lock in the flavor and aroma of the beverage material.

Referring again to FIGS. 3 and 4, the operation of device 10 is illustrated. After removing peel-off seal 38, the device 10 is placed in a cup of hot water with the actuating stick 13 extending out of the cup. Grasping the actuating stick 13, the user presses the stick downwardly flexing the membrane 14 as shown in FIG. 3. Membrane 14, flexing downwardly like a plunger, creates a positive air pressure change in receptacle 12 and expels most of the air contained in the receptacle. Although the bottom of the device 10 may come in contact with the bottom of the cup, air bubbles are forced out the perforations 22 along the lower surface of the receptacle. The user then slightly lifts actuating stick 13 causing membrane 14 to flex upwardly to its initial state, as shown in FIG. 4. This upward flexing of membrane creates a negative pressure change in receptacle 12 and sucks hot water in through perforations 22 and filter 18 to soak the beverage material B contained within the receptacle. The user then repeatedly impulses the actuating stick 13 up and down like a plunger, causing hot water to be alternately sucked up into and expelled out of receptacle 12 through the perforations 22. Preferably, while impulsing actuating stick 13, the bottom of receptacle contacts the bottom of the cup during down-thrusts. This increases the amount of flexing of membrane 14 and assists in the forced purging of the receptacle of air and circulation of the hot water throughout the inside of receptacle 12. The flexing action of membrane 14 creates a thorough circulation of the hot water throughout the beverage material B.

It is the forced sucking and expelling of the hot water through the perforations 22 and through circulation with the beverage material that provide thorough and efficient brewing of the beverage. I have found that, for brewing coffee, about 20 short strokes of the actuating stick 30 provide a delicious cup of fresh brewed coffee. This requires about 20 seconds of time. Additonal strokes provide stronger coffee, fewer strokes provide weaker coffee. In practice, the user determines the number of strokes by observing the color of the beverage and removes the device when the desired strength has been obtained.

After use, device 10 is discarded. Excessive dripping of liquid from the receptacle during removal from the cup, characteristic of the prior art, is minimized because the upper and lower portion 14 and 16 of the device 10 do not absorb water. Only a relatively small amount of water trickles from the perforated lower surface 20 as the device 10 is transferred from the cup to a tray or waste receptacle and this is minimized by inverting the device so that the perforations face upwardly.

In this disclosure, there is shown and described only the preferred embodiment of the invention, but as aforementioned, it is to be understood that the invention is capable of various changes or modifications within the scope of the inventive concept as expressed by the accompanying claims. For example, although device 10 preferably contains only enough beverage material for brewing one cup of beverage, the receptacle can be made larger to contain enough beverage material to make several cups of the beverage before being discarded. As another variation, perforations 22 can extend up along side wall 24 of the lower portion 16 if desired, with filter 18 extending to cover the additional perforations. Alternatively, lower surface 20 can be formed of a water permeable material such as plastic treated woven cloth eliminating the need for filter 18. Further, it is to be understood that the disc-shaped configuration of receptacle 12 is exemplary and could be modified within the spirit of the invention.

What is claimed is:

1. Disposable device for use with a cup of hot water for brewing a single cup of a beverage, comprising: a receptacle containing a predetermined quantity of ground beverage material selected from the group consisting of coffee and tea, said receptacle having a circular horizontal cross-section and a height that is less than the diameter of said cross-section, said receptacle including an annular side portion non-permeable to water a lid that is flexible for vertical reciprocating action and non-permeable to water and a bottom surface that is permeable to water, and manual pumping means flexing only the lid of said receptacle for providing reciprocating flow of said hot water through said water permeable bottom surface and forced circulation of said hot water throughout the beverage material for brewing.

2. The device of claim 1 wherein said bottom surface contains a plurality of perforations, said receptacle including a filter between said bottom surface and said beverage material.

3. The device of claim 1 wherein said lid is circular.

4. The device of claim 3 wherein said lid includes a stand-off portion at the center thereof having a recess for receiving said actuating stick.

5. The device of claim 4 wherein said actuating stick includes an upper portion having a first diameter, and a lower portion having a second diameter larger than said first diameter, said lower portion engaging the recess of said stand-off portion of said lid.

6. The device of claim 1 including a peel-off seal for covering the water permeable bottom surface of said receptacle.

7. The device of claim 6 wherein said peel-off seal is removably attached to said bottom surface with adhesive means, and includes a grip tab for easy removal.

8. The device of claim 1 wherein said lower portion is a perforated.

9. The device of claim 3 wherein said flexible lid has a concave surface.

10. The device of claim 2 wherein said receptacle is formed of a material selected from the group consisting of polystyrene, polypropylene and polyvinyl chloride.

11. The device of claim 2 wherein said lower portion is a circular.

12. The device of claim 11 wherein the diameter of said lid is larger than the diameter of said bottom surface of said receptacle.

13. The device of claim 10, wherein said lid is heat-sealed to the annular side portion of said receptacle.

14. The device of claim 2 wherein said receptacle is formed of aluminum foil.

15. The device of claim 5, wherein said stand off portion comprises a tapered wall portion having a plurality of cross-cuts, a recess for receiving said lower portion of said actuating stick.

16. Disposable device for use with a cup of hot water for brewing a single cup of a beverage, comprising: a receptacle containing a predetermined quantity of ground beverage material selected from the group consisting of coffee and tea, said receptacle having a circular horizontal cross-section and a height that is less than the diameter of said cross-section, said receptacle including an annular side portion non-permeable to water a planar bottom surface having apertures for receiving water, said receptacle containing said beverage material; a vertically flexible lid secured to said annular side portion, and an actuating stick attached to a central portion of said lid for vertically pumping said lid, whereby reciprocating flow of hot water through said apertures and throughout said beverage material is provided for brewing.

* * * * *